(12) United States Patent
Starodoumov (10) Patent No.: US 8,582,611 B2
(45) Date of Patent: Nov. 12, 2013

(54) FREQUENCY-TRIPLED FIBER-MOPA

(75) Inventor: Andrei Starodoumov, Cupertino, CA (US)

(73) Assignee: Coherent, Inc., Santa Clara, CA (US)

( * ) Notice: Subject to any disclaimer, the term of this patent is extended or adjusted under 35 U.S.C. 154(b) by 85 days.

(21) Appl. No.: 13/355,352

(22) Filed: Jan. 20, 2012

(65) Prior Publication Data

US 2013/0188658 A1    Jul. 25, 2013

(51) Int. Cl.
*H01S 3/10* (2006.01)
(52) U.S. Cl.
USPC .............. 372/22; 372/21; 372/27; 372/30
(58) Field of Classification Search
USPC .............................. 372/21, 22, 27
See application file for complete search history.

(56) References Cited

U.S. PATENT DOCUMENTS

| | | | |
|---|---|---|---|
| 5,136,597 A | 8/1992 | Nightingale | |
| 5,867,305 A | 2/1999 | Waarts et al. | |
| 5,940,418 A | 8/1999 | Shields | |
| 6,765,934 B2 | 7/2004 | Gross | |
| 7,292,387 B2 | 11/2007 | Hoffman et al. | |
| 7,920,606 B2 | 4/2011 | Starodoumov et al. | |
| 2006/0222372 A1 | 10/2006 | Spinelli et al. | |
| 2007/0211773 A1 | 9/2007 | Gerstenberger et al. | |
| 2007/0263679 A1 | 11/2007 | Staroudoumov et al. | |
| 2007/0263680 A1* | 11/2007 | Starodoumov et al. | 372/22 |
| 2010/0150183 A1* | 6/2010 | Starodoumov et al. | 372/6 |
| 2010/0272137 A1 | 10/2010 | Kopf et al. | |
| 2013/0044768 A1* | 2/2013 | Ter-Mikirtychev | 372/5 |

FOREIGN PATENT DOCUMENTS

| | | |
|---|---|---|
| EP | 0605110 A2 | 7/1994 |
| WO | 2012/069612 A2 | 5/2012 |
| WO | 2012/121920 A2 | 9/2012 |
| WO | 2012/069612 A3 | 2/2013 |

OTHER PUBLICATIONS

International Search Report and Written Opinion received for PCT Patent Application No. PCT/US2013/020702, mailed on May 28, 2013, 19 pages.
International Search Report and Written Opinion received for PCT Patent Application No. PCT/US2009/065579, mailed on Feb. 5, 2010, 14 pages.
Non Final Office Action received for U.S. Appl. No. 12/335,015, mailed on Jun. 24, 2010, 11 pages.
Restriction Requirement received for U.S. Appl. No. 12/335,015, mailed on May 7, 2010, 6 pages.
Notice of Allowance received for U.S. Appl. No. 12/335,015, mailed on Dec. 9, 2010, 7 pages.
Unpublished U.S. Appl. No. 13/115,871, filed on May 25, 2011, titled "Frequency-Tripled Fiber MOPA", 27 pages.
Starodoumov et al., "Hybrid fiber MOPA-bulk amplifier system for frequency conversion," Proceedings of the SPIE, vol. 6871, 2008, pp. 68710V.1-68710V.8.

* cited by examiner

*Primary Examiner* — Dung Nguyen
(74) *Attorney, Agent, or Firm* — Morrison & Foerster LLP (57) ABSTRACT

In a frequency-tripled fiber-MOPA, a pre-amplified plane-polarized seed-pulse having a fundamental frequency is divided into two pulse-components, plane-polarized in polarization-orientations at 90-degrees to each other. The fundamental-wavelength pulse-components are amplified in a common amplifier-fiber. The amplified components are separately propagated on different optical paths. One of the amplified components is frequency-doubled. The frequency-doubled component on one path and fundamental-frequency component on the other path are then combined on a common-path and sum-frequency mixed to provide a frequency-tripled pulse.

19 Claims, 5 Drawing Sheets

FREQUENCY-TRIPLED FIBER-MOPA

TECHNICAL FIELD OF THE INVENTION

The present invention relates in general to pulsed fiber master oscillator power amplifier (MOPA) laser systems. The invention relates in particular to fiber-MOPA systems the output of which is converted to pulses of ultraviolet radiation by frequency-tripling (third-harmonic generation) in optically nonlinear crystals.

DISCUSSION OF BACKGROUND ART

Pulsed fiber-MOPAs are increasingly being used in applications that require compact and robust monolithic design, good stability and excellent beam quality. Fiber-amplifiers exhibit much higher gain, typically between about 20 decibels (dB) and 40 dB, than solid-state amplifiers (typically between about 10 dB and 20 dB). This makes fiber-MOPAs attractive for amplification of a small signal (seed-pulse) from a master oscillator to high average and peak powers.

A master oscillator (for example, semiconductor diode-laser) can be easily modulated at a high pulse-repetition rate (PRF), for example, up to about 1 Gigahertz (GHz) while generating pulses with an arbitrary length, for example between about 0.1 nanoseconds (ns) and 10 microseconds ($\mu$s). This is one reason why fiber-MOPA systems offer better flexibility and choice in pulse-lengths (pulse-durations) and PRFs than solid-state lasers.

Most fiber-lasers operate at a wavelength in an infrared (IR) wavelength range. There is also, however, a growing demand for reliable, compact, pulsed laser-sources in visible and ultraviolet (UV) spectral ranges. This could be satisfied by frequency-converting the output of infrared-laser sources.

In general, pulses having a narrow bandwidth (less than about 0.6 nm), linear polarization, and high peak-power, for example greater than about 1 kilowatt (kW) are required for efficient conversion of IR radiation into visible and UV range. However, conventional high-power fiber-laser oscillators usually operate with broader bandwidths for example greater than about 1 nm. Further, high peak-power required for efficient harmonic generation is limited by nonlinear effects in fibers such as stimulated Brillouin scattering (SBS), stimulated Raman scattering (SRS), and Four-Wave Mixing (FWM). These effects further broaden pulse bandwidth.

A limited peak-power results in a limited average power at a fixed PRF and pulse-duration. One method for overcoming this peak-power limitation is described in U.S. Pat. No. 7,920,606. In this method seed-pulses, or pre-amplified seed-pulses, having a fundamental wavelength are split into first and second portions with the portions amplified separately in respectively first and second fiber-amplifiers. Amplified pulses from one of the fiber-amplifiers are frequency-doubled by second-harmonic generation (2HG) in one optically nonlinear crystal. These 2H-pulses are then sum-frequency mixed in another optically nonlinear crystal with amplified fundamental wavelength pulses from the other fiber-amplifier to generate frequency-tripled (third-harmonic) pulses. This method provides double the total power of a single amplifier for the third-harmonic generation (3HG).

A drawback of this method of course is that two fiber-amplifiers (power amplifiers) must be provided, each requiring pump-diodes and associated pump-light coupling optics. This adds significantly to the cost of the system. There is a need for fiber-MOPA system that overcomes the peak-power limitation of fiber-amplifiers with only one power fiber-amplifier or fiber-amplifier chain.

SUMMARY OF THE INVENTION

In one aspect of the present invention, a method for operating a pulsed MOPA including a polarization-maintaining fiber-amplifier having one or more fiber-amplifier stages, comprises generating a plane-polarized pulse to be amplified in the fiber-amplifier, the pulse having a fundamental frequency. The plane-polarized pulse is divided into first and second plane-polarized pulse-components having polarization orientations at 90-degrees to each other. The first and second plane-polarized pulse-components are amplified in the polarization-maintaining fiber-amplifier, thereby providing first and second amplified plane-polarized pulse-components. The first and second amplified plane-polarized pulse-components are directed along respectively first and second separate optical paths. The first amplified plane-polarized pulse-component is frequency-doubled in the first optical path thereby generating a first frequency-doubled plane-polarized pulse-component having a frequency which is the second harmonic of the fundamental frequency.

In a first example of the inventive method, the first frequency-doubled plane-polarized pulse-component and the second amplified plane-polarized pulse-component are combined on a common path, then sum-frequency mixed to provide a frequency-tripled plane-polarized pulse having a frequency which is the third harmonic of the fundamental frequency. In a second example of the inventive method, both amplified plane-polarized pulse-components are frequency-doubled to provide first and second frequency-doubled plane-polarized pulse-components. These are combined on a common path, then frequency-doubled to provide a frequency-quadrupled plane-polarized pulse having a frequency which is the fourth harmonic of the fundamental frequency.

In a variation of the first example, the first and second plane-polarized pulse components are temporally separated by an optical delay arrangement before being amplified in the polarization-maintaining fiber-amplifier, such that the first and second amplified plane-polarized pulse components are correspondingly temporally separated. A difference in the first and second optical paths is selected such that the frequency-doubled plane-polarized pulse-component and the second amplified plane-polarized pulse-component are temporally overlapped when combined in the common path.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figures 1, 1A:
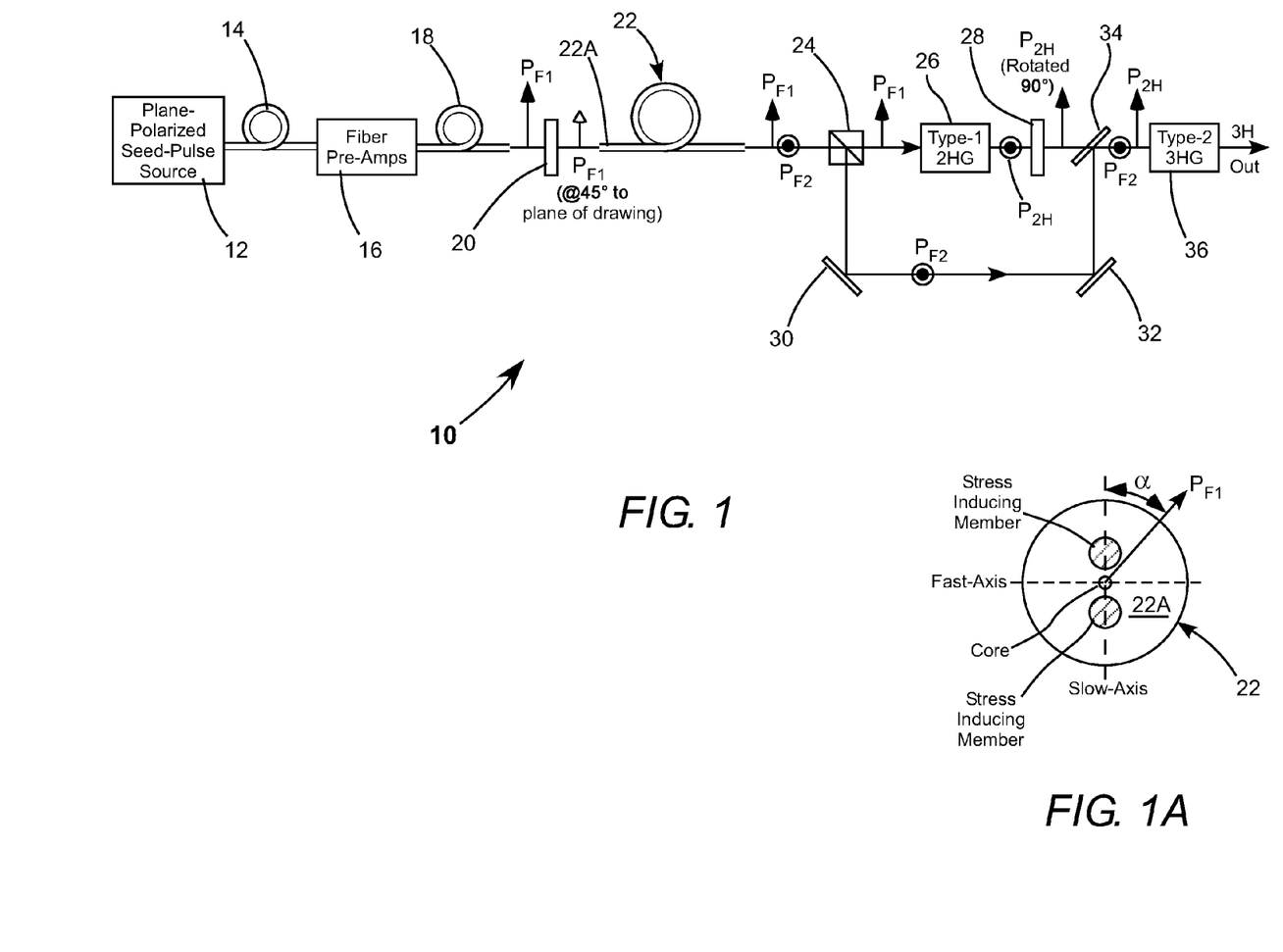
FIG. 1 schematically illustrates one preferred embodiment of a frequency-tripled MOPA in accordance with the present invention, including a source of plane-polarized seed-pulses, a pre-amplifier for amplifying the seed-pulses, an optical arrangement for dividing a pre-amplified seed-pulse into two plane-polarized, fundamental-wavelength pulse-components with orthogonally-oriented polarization planes, an amplifier-fiber for amplifying the two pulse-components, an arrangement for polarization-separating the amplified pulse-components along first and second separate paths, with the component in the first path being type-1 frequency-doubled, and an arrangement for combining the frequency-doubled component with the fundamental component on a common path for type-2 third-harmonic generation.
FIG. 1A schematically illustrates details of the polarization-dividing arrangement of the MOPA of FIG. 1.

Referring now to the drawings, wherein like components are designated by like reference numerals, FIG. 1 schematically illustrates one preferred embodiment 10 of a frequency-tripled fiber MOPA in accordance with the present invention. MOPA 10 includes a seed-pulse source 12 delivering seed-pulses of plane-polarized radiation having a fundamental frequency F. The pulses are delivered by a polarization-maintaining transport fiber 14 to optionally one or more stages of fiber amplification 16, which delivers amplified, plane-polarized seed-pulses via another polarization-maintaining transport fiber 18. Here, the pulses are plane-polarized in the plane of the drawing as depicted by arrow $P_{F1}$. It should be noted here that any fibers described in this and any other embodiments of the present invention described herein below are assumed to be polarization-maintaining fibers unless otherwise designated.

The pulses are transmitted through a half-wave plate 20 arranged to rotate polarization plane $P_{F1}$ of the pulses by angle α (to the plane of the drawing). The polarization rotated pulses are delivered to a polarization-maintaining, high-power amplifier-fiber 22 which, here, has a slow polarization-axis in the plane of the drawing and a fast-axis perpendicular to the plane of the drawing. The angle α determines the splitting ratio between parts of the light polarized along slow and fast axis. An angle of 45° provides equal splitting. Pumping arrangements for amplifier-fibers such as amplifier-fiber 22 are well known in the art and a detailed description thereof is not necessary for understanding principles of the present invention. Accordingly, a description of any such arrangement is not described or depicted herein for simplicity of description.

The orientation of the polarization plane of input pulses with respect to fiber-amplifier 20 is depicted in FIG. 1A, which schematically illustrates end 22A of fiber 22. Two stress-inducing members induce stress birefringence in the fiber core and define the fast- and slow-axes of (the core of) fiber 22, with polarization plane $P_{F1}$ at an angle α, for example 45°, to the slow-axis. This birefringence resolves (splits or divides) the pulses into two components, plane-polarized orthogonally with respect to each other, with one polarized in the original $P_{F1}$ orientation and the other in an orientation $P_{F2}$ perpendicular to the plane of the drawing.

The two orthogonally polarized pulse-components are amplified in the power amplifier-fiber to a total peak power above the limited peak power of a linearly polarized pulse, while peak power in each pulse-component is lower by maximum of about 25% due to SRS for orthogonally polarized electromagnetic fields. If the pulse-components have different amplitudes, for example by having angle α greater or less than 45°, then the limit for the maximum peak-power caused by an additional gain from orthogonally polarized light can vary from about 75% to about 99% depending on the peak-power of the pulses.

At the output of the high-power amplifier 22, the amplified orthogonally polarized pulse-components are separated by a polarization beam-splitter 24. Pulse-components with a polarization $P_{F1}$ in the plane of the drawing (and preferably having a higher power than the $P_{F2}$ components) go to an optically nonlinear crystal 26 arranged for type-I 2HG. The 2HG pulse-components from crystal 26 have an initial orientation $P_{2H}$ perpendicular to the plane of the drawing. The polarization of these components is rotated by 90° into the plane of the drawing by a half-wave plate 28. The polarization rotated $P_{2H}$ components are transmitted through a dichroic beam-combiner 34. $P_{F2}$ components reflected by polarization beam-splitter 24 are directed by mirrors 30 and 32 to dichroic beam-combiner 34 which spatially and temporally overlaps the 2H pulses with the $P_{F2}$ components of the fundamental pulses and delivers the pulses and components to an optically nonlinear crystal 36 arranged for type-2 sum-frequency mixing. Crystal 36 generates third-harmonic (3H) output pulses from the overlapping orthogonally polarized 2H and fundamental components transmitted therethrough.

To increase peak power in pulses in each polarization state it is necessary to eliminate a cross-polarization Raman gain. This can be done by separating pulse-components not only by polarization-orientation, but also temporally, so there is no temporal overlap of pulse-components in the amplifier-fiber. Temporal separation can be realized by introducing a delay-line for a pulse in one of the polarization orientations.

Figures 2, 2A:
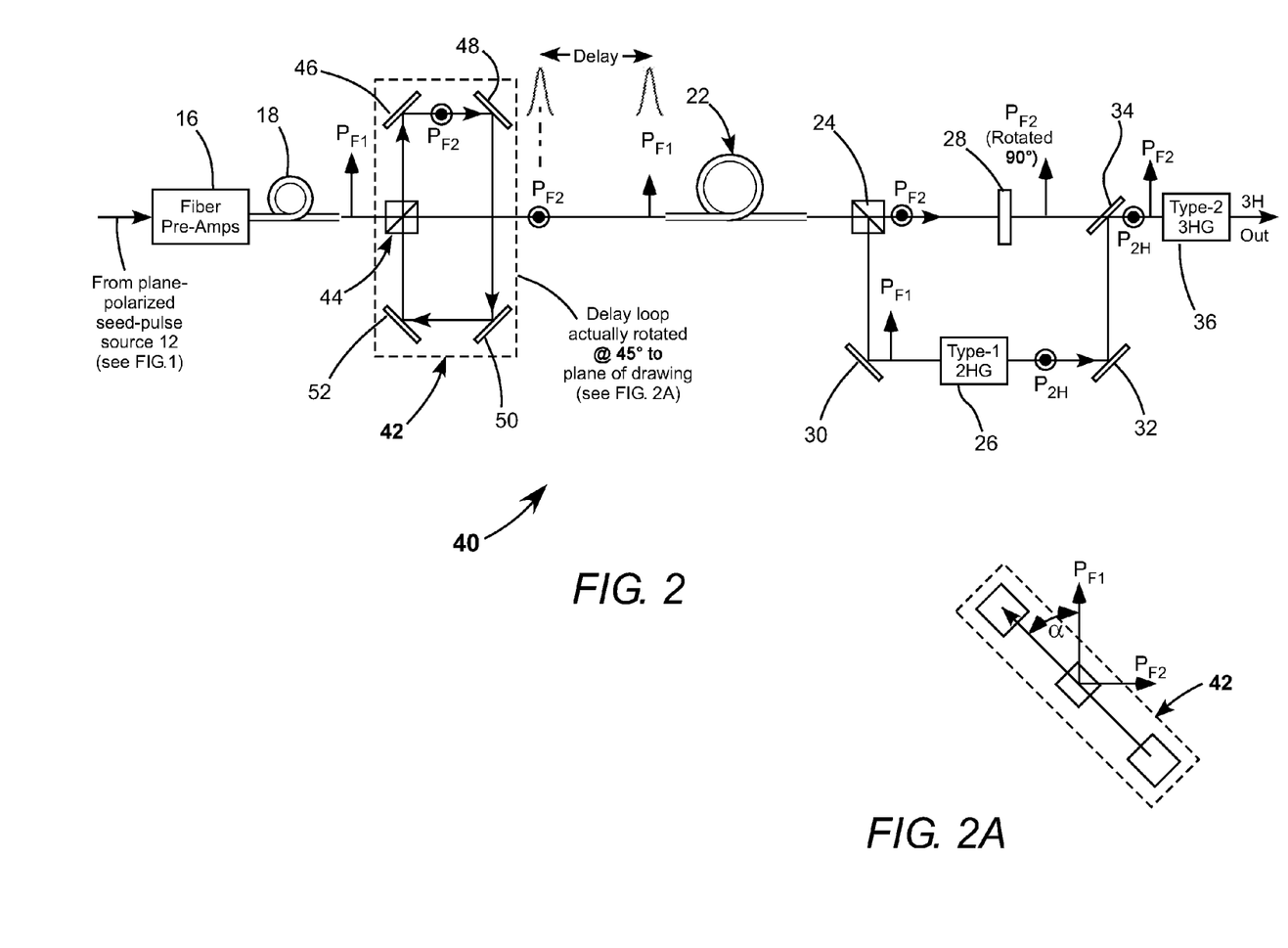
FIG. 2 schematically illustrates another preferred embodiment of a frequency-tripled MOPA in accordance with the present invention, similar to the embodiment of FIG. 1 but further including a free-space optical delay-loop arranged to provide the dividing of the pulse into the two components and temporally separate the two components before amplification in the amplifier-fiber.
FIG. 2A schematically illustrates details of the free-space delay-loop in the MOPA of FIG. 2.

FIG. 2 schematically illustrates another preferred embodiment 40 of a frequency tripled fiber-MOPA in accordance with the present invention in which such a temporary (during amplification) temporal separation is achieved. MOPA 40 is similar to MOPA 10 of FIG. 1 with certain exceptions. A principal one of these exceptions is that half-wave plate 20 of MOPA 10 is replaced by a polarization-sensitive delay-loop 42 including a polarization beam-splitter (beam-combiner) 44, cooperative with four minors 46, 48, 50, and 52. Delay-loop 40 is shown aligned in the plane of the drawing in FIG. 2 for convenience of illustration. In practice, the polarization-sensitive delay loop is inclined at an angle α to the plane of the drawing and accordingly to the polarization-plane of radiation delivered from fiber preamplifiers 16 via transport fiber 18. This is depicted in FIG. 2A.

The inclination of beam-splitter 44 resolves an incident pulse into two plane-polarized components $P_{F1}$ and $P_{F2}$ with planes thereof orthogonally oriented, and with relative amplitudes thereof determined by angle αα. The $P_{F1}$ component is transmitted by beam-splitter 40. The $P_{F2}$ component is reflected by the beam-splitter into the delay-loop, where it is reflected sequentially by mirrors 44, 46, 48, and 50, and then reflected by the beam-splitter along the path followed by the $P_{F1}$ component, but delayed by the round-trip time in the delay-loop. Preferably, the delay-loop is configured such that this delay is greater than about 0.5-times the pulse-duration.

The delayed components are separately amplified in amplifier-fiber 22. The amplified $P_{F2}$ component is transmitted by polarization beam-splitter 24; polarization rotated 90° by half-wave plate 28; then transmitted through dichroic beam-combiner 34 to optically nonlinear crystal 36. The amplified $P_{F1}$ component is reflected by beam-splitter 24; directed by mirror 30 to optically nonlinear crystal 26; and frequency-doubled by the optically nonlinear crystal. The frequency-doubled pulse $P_{2H}$ is directed by mirror 32 and dichroic beam-combiner 34 to optically nonlinear crystal 36 along the same path as the transmitted fundamental $P_{F2}$ component.

The optical path-length from polarization beam-splitter 24 to dichroic beam combiner 34 via mirrors 30 and 32 is selected to be longer than the direct optical path-length between the polarization beam-splitter and the dichroic beam-combiner by an amount equal to the round trip length in delay-loop 42. This enables the $P_{F2}$ component that was delayed for separate amplification to "catch-up with" the $P_{2H}$ component generated from the amplified $P_{F1}$ component, such that the $P_{F2}$ and $P_{2H}$ components incident on optically nonlinear crystal 36 are spatially and temporally overlapping. It should be noted here that the arrangement of beam-splitter 24, mirrors 30 and 32, and beam-combiner 34 is depicted in the plane of the drawing for convenience of illustration. In practice, i.e., to function as described, this arrangement would be perpendicular to the plane of the drawing.

Temporal and polarization de-coupling of the two pulse-portions allows increasing of the peak-power for each portion to the maximum value limited by stimulated Raman scattering or other nonlinear effects for a single pulse. This allows doubling of the average IR power that could be obtained from the same amplifier with single pulses.

Figures 3, 3A:
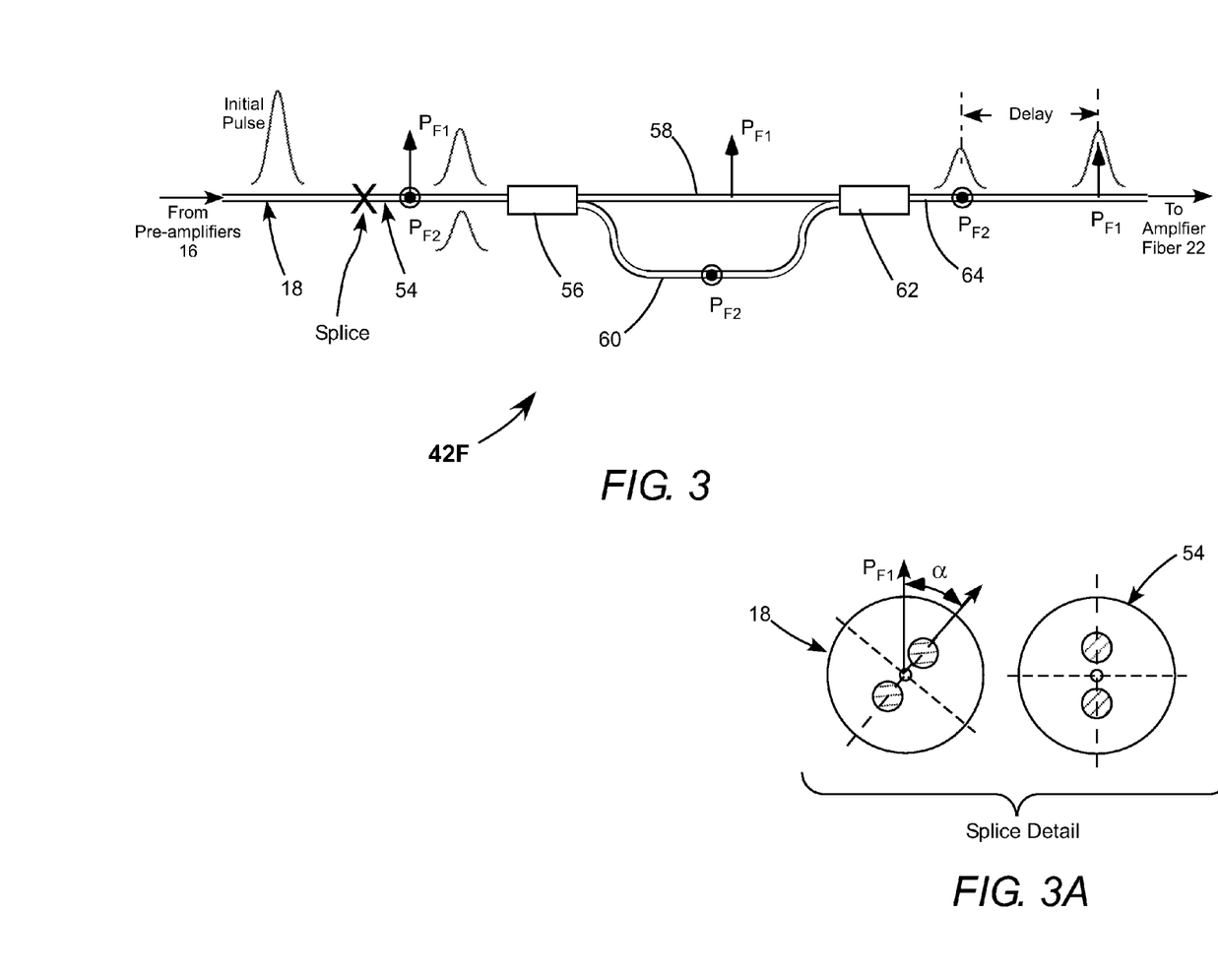
FIG. 3 schematically illustrates an all-fiber delay-loop which can be substituted for the free-space delay-loop in the MOPA of FIG. 2.
FIG. 3A schematically illustrates a fiber-splice arrangement for providing the pulse-dividing in the all-fiber delay-loop of FIG. 3.

FIG. 3 schematically illustrates an "all-fiber" alternate arrangement 42F for pulse-component delay, which can be substituted for free-space delay-loop 42 in the embodiment of FIG. 2. Here polarization-maintaining fiber 18 from the seed-pulse source and associated preamplifiers is spliced to a polarization-maintaining input-fiber 54 of the delay arrangement. The fibers are spliced with corresponding polarization-axes at an angle α to each other, as depicted schematically in FIG. 3A. This resolves an initial "single-component" pulse into orthogonally polarized pulse-components $P_{F1}$ and $P_{F2}$. A fiber polarization-splitter 56 directs the $P_{F1}$ component along a "short-branch" fiber 58, and directs the $P_{F2}$ component along a "long-branch" fiber 60. A polarization-coupler 62 connects both pulse-components, temporally separated, into a fiber 64 for transport to fiber-amplifier 22. The difference in length between fiber 60 and fiber 58 is selected to provide the desired temporal separation (delay). Fiber polarization couplers and splitters are available commercially, for example from Gooch and Housego Ltd, of Ilminster, UK. It should be noted that delay line may be incorporated even before the last pre-amplifier allowing increasing an average seed power for the final power amplifier 22.

In above described embodiments of the present invention the fiber power amplifier is represented by a single amplifier-fiber. Those skilled in the art will recognize that such a fiber power amplifier may include two or more stages of fiber amplification, separately pumped. Splitting a pulse to be amplified into two components and delaying components with respect to each other may occur ahead of any such amplification stage and as noted above could also occur ahead of any stage designated as a preamplifier. Separating the amplified pulse-components will always occur following the final amplification stage.

Figure 4:
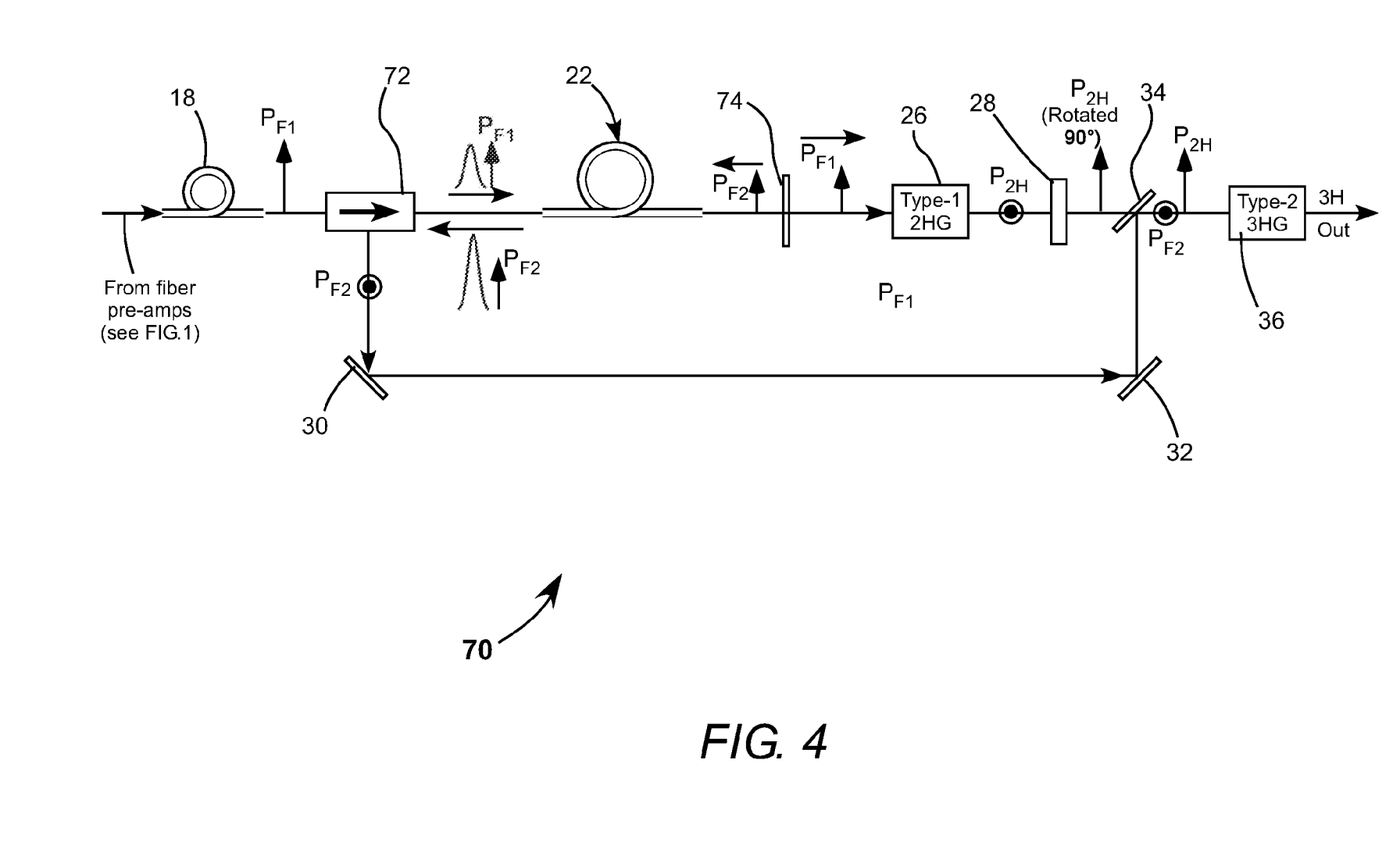
FIG. 4 schematically illustrates yet another preferred embodiment of a frequency-tripled MOPA in accordance with the present invention, similar to the embodiment of FIG. 1 but wherein the pre-amplified pulses is further amplified by the amplifier-fiber before being amplitude-divided into two pulse-portions with the same polarization orientation with one portion propagating along the first path and the other portion being counter-propagated back through the amplifier-fiber and then diverted with polarization orientation rotated by 90° into the second path by a Faraday isolator.

FIG. 4 schematically illustrates yet another embodiment 70 of a frequency-tripled fiber MOPA in accordance with the present invention. Components common to the embodiment of FIG. 1 are designated by like reference numerals. In MOPA 70, a preamplified plane-polarized pulse having a polarization-orientation $P_{F1}$ is passed through a Faraday isolator 72 to amplifier-fiber 22. A small portion $P_{F2}$, for example between about 1% and 10%, of the amplified $P_{F1}$ pulse is reflected back into the amplifier by a low-reflecting (partially reflecting and partially transmitting) mirror 74. The reflected $P_{F2}$ pulse-portion has the same polarization orientation as the transmitted portion. The reflected small portion is amplified by counter propagation through the amplifier-fiber and is delivered from the fiber to isolator 72. In the isolator, the polarization orientation of the amplified $P_{F2}$ pulse-component is rotated by 90° (as part of the isolator function) and the pulse-component is delivered laterally from the isolator.

The $P_{F1}$ pulse-component is transmitted by partially-reflecting mirror 74, and is frequency-doubled by optically nonlinear crystal 26. The frequency-doubled pulse-component $P_{2H}$ initially has a polarization orientation perpendicular to the plane of the drawing. This is rotated by 90° into the plane of the drawing by half-wave plate 28, and transmitted through dichroic beam-combiner 34 along a path to optically nonlinear crystal 36, which is arranged for type-2 third-harmonic generation. The amplified $P_{F2}$ pulse-component from the isolator is directed by mirrors 30 and 32 to the dichroic beam-combiner, which reflects the $P_{F2}$ pulse-component to crystal 36 along the same path as the $P_{2H}$ pulse-component.

Depending on the duration of the initial $P_{F1}$ pulse delivered to amplifier-fiber 22 and the difference in optical paths followed by forward-propagated and counter-propagated pulse-components to optically nonlinear crystal 36, it may be necessary to include a delay arrangement in the path between partially reflecting mirror 74 and dichroic beam-combiner 34 to ensure that the $P_{2H}$ and $P_{F2}$ pulse-components temporally overlap at crystal 36. Further, while the pulse division by partial reflection and partial transmission is described and depicted as being accomplished by a mirror spaced apart from the amplifier fiber, this division could instead be accomplished using a fiber Bragg grating (FBG) in the end of the amplifier-fiber, or simply by an uncoated end-face of the amplifier-fiber.

In above-described embodiments of the present invention, an initial pulse is divided into two components by polarization separation, temporal separation, or directional separation. One component is frequency doubled and other component is sum frequency-mixed with the frequency doubled component to provide a third-harmonic pulse. The present invention is not limited, however, to this particular scheme and the pulse-components may be frequency converted in other ways.

Figure 5:
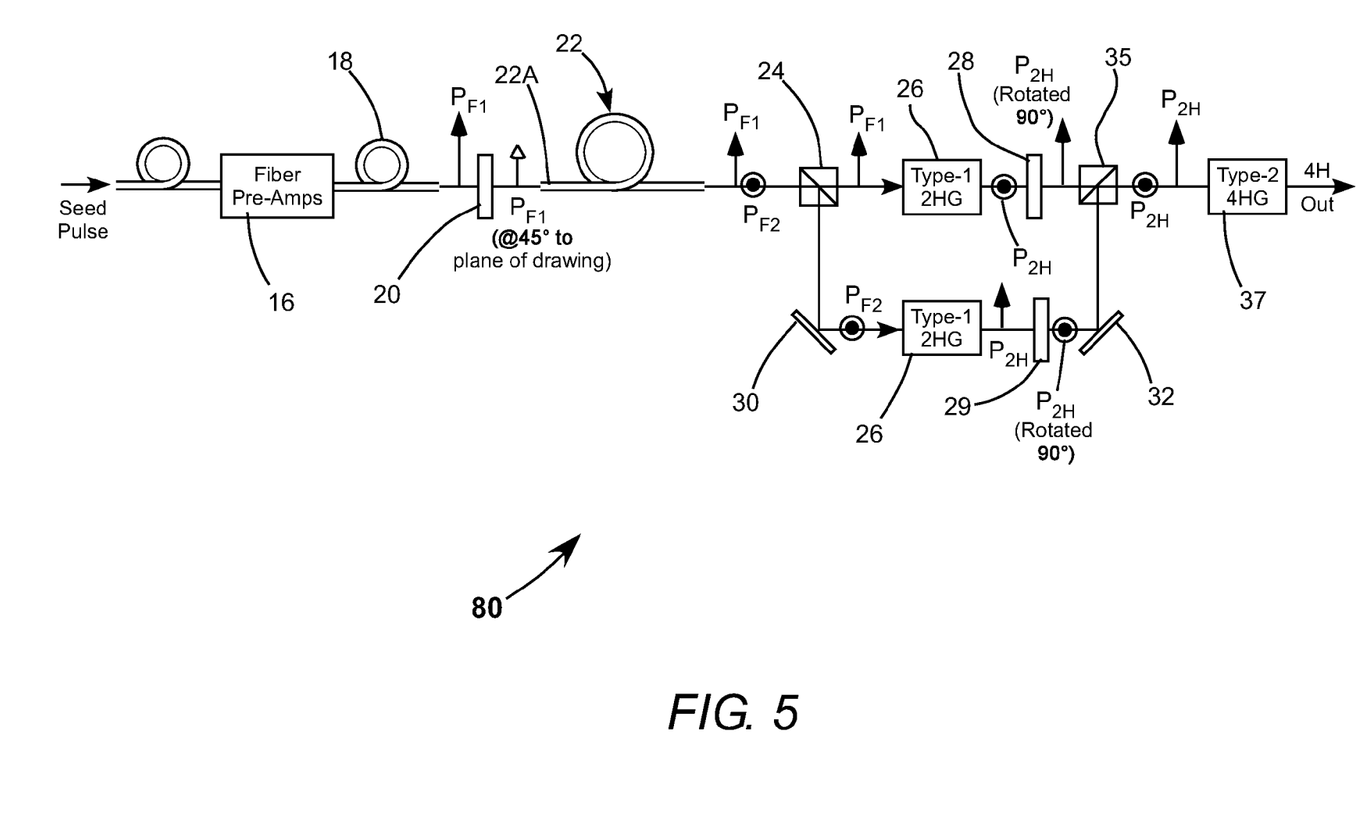
FIG. 5 schematically illustrates still another preferred embodiment of a frequency-tripled MOPA in accordance with the present invention, similar to the embodiment of FIG. 1 but wherein the pulse-components in the first and second paths are each type-1 frequency-doubled and the frequency-doubled components are combined on the common path for type-2 fourth-harmonic generation.

By way of example, FIG. 5 schematically illustrates an embodiment 80 of a frequency-quadrupled MOPA in accordance with the present invention. MOPA 80 is similar to MOPA 10 of FIG. 1, with an exception that the $P_{F2}$ component from amplifier 22 is also frequency-doubled. For combining the two frequency-doubled components dichroic beam-combiner 34 of MOPA 10 is replaced in MOPA 80 by a polarization beam-combiner 35. Half-wave plates 28 and 29 are provided for rotating the polarization planes of the frequency-doubled pulse-components into the correct orientation for combination by beam-combiner 35. The combined orthogonally-polarized components are type-2 frequency quadrupled by an optically nonlinear crystal 37.

The embodiment of FIG. 5 can be modified by temporally separating the pulse components using, for example, one of the delay loops 42 or 42F of FIG. 2 or FIG. 3. In that case, the path lengths through the two crystals 26 would be selected so that the two pulse components would overlap in crystal 37.

It should be noted here that in any of the above described embodiments of the present invention wherein there is a free-space optical arrangement between two fibers, there will be a collimating lens to collimate the output of one fiber and a focusing lens for focusing a pulse from the free-space arrangement into the next fiber. Further, regarding frequency-conversion, there will be an optical-relay arrangement associated with any optically nonlinear crystal for creating a beam-waist in the optically nonlinear crystal. Such collimating, focusing, and relay arrangements are well known in the art to which the present invention pertains, and a detailed description thereof is not necessary for understanding principles of the present invention. Accordingly, such detailed descriptions are not provided in this specification, for convenience of illustration and description.

In summary, the present invention is described above with reference to preferred embodiments. The invention, however, is not limited by the embodiments described and depicted. Rather, the invention is defined by the claims appended hereto.

What is claimed is:

1. A method for operating a pulsed MOPA including a polarization-maintaining fiber-amplifier having one or more fiber-amplifier stages, the method comprising:
   generating a plane-polarized pulse to be amplified by the fiber-amplifier, the pulse having a fundamental frequency;
   dividing the pulse into first and second plane-polarized pulse-components having polarization orientations at 90-degrees to each other;
   amplifying the first and second plane-polarized pulse-components in the polarization-maintaining fiber-amplifier thereby providing first and second amplified plane-polarized pulse-components;
   directing the first and second amplified plane-polarized pulse-components along respectively first and second separate optical paths; and
   frequency-doubling the first amplified plane-polarized pulse-component in the first optical path, thereby generating a first frequency-doubled plane-polarized pulse-component having a frequency which is the second harmonic of the fundamental frequency.

2. The method of claim 1, further including combining the first frequency-doubled pulse-component and the second amplified plane-polarized pulse-component along a common path, and generating a frequency-tripled plane-polarized optical pulse having a frequency three-times the fundamental frequency by sum-frequency mixing the first frequency-doubled plane-polarized pulse-component and the second amplified plane-polarized pulse-component.

3. The method of claim 2, wherein the frequency-doubling of the first amplified plane-polarized pulse-component in the first optical path is type-1 frequency doubling.

4. The method of claim 3, wherein the generation of the frequency-tripled plane-polarized optical pulse a frequency tripled plane-polarized optical pulse is by type-2 sum-frequency mixing the first frequency-doubled plane-polarized pulse-component and the second amplified plane-polarized pulse-component.

5. The method of claim 1, further including frequency-doubling the second amplified plane-polarized pulse-component in the second optical path thereby generating a second frequency-doubled plane-polarized amplified pulse-component having a frequency which is the second harmonic of the fundamental frequency, combining the first and second frequency-doubled plane-polarized pulse-components along a common path, and generating a frequency-quadrupled plane-polarized optical pulse having a frequency four-times the fundamental frequency by frequency-doubling the first and second frequency-doubled pulse-components.

6. The method of claim 5, wherein the frequency-doubling of the first and second amplified plane-polarized pulse-components in the first and second optical paths is type-1 frequency doubling.

7. The method of claim 6, wherein the generating of the frequency-quadrupled plane-polarized optical pulse having a frequency four-times the fundamental frequency is by type-2 frequency-doubling the first and second frequency-doubled pulse-components.

8. The method of claim 1, further including temporally separating the first and second plane-polarized pulse-components with respect to each other prior to the amplifying.

9. The method of claim 8, wherein the temporal separation of the first and second plane-polarized pulse-components is by at least about 0.5 times the pulse duration thereof.

10. The method of claim 8, further including temporally and spatially overlapping the temporally separated first frequency-doubled plane-polarized and second amplified plane-polarized pulse-components along a common path, and generating therefrom a frequency tripled plane-polarized optical pulse having a frequency three-times the fundamental frequency by sum-frequency mixing the first frequency-doubled plane-polarized pulse-component and the second amplified plane-polarized pulse-component.

11. A method for operating a pulsed MOPA including a polarization-maintaining fiber-amplifier having one or more fiber-amplifier stages, the method comprising:
    generating a plane-polarized pulse to be amplified in the fiber-amplifier, the pulse having a fundamental frequency;
    dividing the pulse into first and second plane-polarized pulse-components having polarization orientations at 90-degrees to each other;
    temporally separating the first and second plane-polarized pulse-components with respect to each other;
    amplifying the temporally separated first and second plane-polarized pulse-components in the polarization-maintaining fiber-amplifier thereby providing first and second temporally separated amplified plane-polarized pulse-components;
    directing the first and second temporally separated amplified plane-polarized pulse-components along respectively first and second separate optical paths; and
    frequency-doubling the first amplified plane-polarized pulse-component in the first optical path, thereby generating a first frequency-doubled plane-polarized amplified pulse-component having a frequency which is the second harmonic of the fundamental frequency.

12. The method of claim 11 further including temporally overlapping the first frequency-doubled plane-polarized pulse-component and the second amplified pulse-component along a common path, and generating a frequency-tripled plane-polarized optical pulse having a frequency three-times the fundamental frequency by sum-frequency mixing the first frequency-doubled plane-polarized pulse-component and the second amplified plane-polarized pulse-component.

13. MOPA apparatus, comprising:
a seed pulse generator arranged to generate a plane-polarized pulse to be amplified, the pulse having a fundamental frequency;
an optical arrangement for dividing the pulse into first and second plane-polarized pulse-components having polarization orientations at 90-degrees to each other;
a polarization-maintaining fiber-amplifier for amplifying the first and second plane-polarized pulse-components thereby providing first and second amplified plane-polarized pulse-components;
an optical arrangement for directing the first and second amplified plane-polarized pulse-components along respectively first and second separate optical paths; and
a first optically nonlinear crystal disposed in the first optical path and arranged for type-1 frequency-doubling the first amplified plane-polarized pulse-component, thereby generating a first frequency-doubled plane-polarized pulse-component having a frequency which is the second harmonic of the fundamental frequency.

14. The apparatus of claim 13, further including an optical arrangement for combining the first and second optical paths into a common path, and a second optically nonlinear crystal located in the common path.

15. The apparatus of claim 14 wherein the second optically nonlinear crystal is arranged for generating a frequency-tripled pulse having a frequency which is the third-harmonic of the fundamental frequency from the first frequency-doubled plane-polarized pulse-component and the second amplified plane-polarized pulse-component.

16. The apparatus of claim 15, further including an arrangement for temporally separating the first and second plane-polarized pulse-components prior to amplification in the fiber-amplifier, and wherein there is difference in length between the first and second optical paths selected such that the first frequency-doubled plane-polarized pulse-component and the second amplified plane-polarized pulse-component are temporally overlapped prior to the frequency-tripled pulse generation.

17. The apparatus of claim 14, further including an arrangement for temporally separating the first and second plane-polarized pulse-components prior to amplification in the fiber-amplifier, and wherein there is difference in length between the first and second optical paths selected such that the first frequency-doubled plane-polarized pulse-component and the second amplified plane-polarized pulse-component are temporally overlapped prior to entering the second optically nonlinear crystal.

18. The apparatus of claim 17, further including a third optically nonlinear crystal disposed in the first optical path and arranged for type-1 frequency-doubling the second amplified plane-polarized pulse-component, thereby generating a second frequency-doubled plane-polarized pulse-component having a frequency which is the second harmonic of the fundamental frequency and wherein the second optically nonlinear crystal is arranged for generating a frequency-quadrupled pulse having a frequency which is the fourth harmonic of the fundamental frequency from the first and second frequency-doubled-plane polarized pulse components.

19. The apparatus of claim 13, further including a second optically nonlinear crystal disposed in the first optical path and arranged for type-1 frequency-doubling the second amplified plane-polarized pulse-component, thereby generating a second frequency-doubled plane-polarized pulse-component having a frequency which is the second harmonic of the fundamental frequency, and an optical arrangement for combining the first and second optical paths into a common path, and a third optically nonlinear crystal located in the common path and arranged for generating a frequency-quadrupled pulse having a frequency which is the fourth harmonic of the fundamental frequency from the first and second frequency-doubled-plane polarized pulse components.

* * * * *